United States Patent [19]

Belcher et al.

[11] 4,409,455
[45] Oct. 11, 1983

[54] DIELECTRIC HEATING SECTION FOR BLOW MOLDING MACHINE

[75] Inventors: Samuel L. Belcher, Cincinnati, Ohio; Timothy R. Peck, Kiawah Island, S.C.; Roger D. Smith, Bethel, Ohio

[73] Assignee: Cincinnati Milacron Inc., Cincinnati, Ohio

[21] Appl. No.: 355,223

[22] Filed: Mar. 5, 1982

[51] Int. Cl.³ ................... H05B 6/54; B29H 5/26
[52] U.S. Cl. .................... 219/10.81; 219/10.71; 219/10.57; 264/26; 264/DIG. 46; 425/174.8 E
[58] Field of Search ............... 219/10.81, 10.67, 10.69, 219/10.71, 10.57, 10.43, 10.77, 10.75; 264/24, 25, 26, 27, DIG. 46; 425/174.8 R, 174.8 E, 174.4, DIG. 13, 526

[56] References Cited

U.S. PATENT DOCUMENTS

| | | | |
|---|---|---|---|
| 1,900,573 | 3/1933 | McArthur | 219/10.71 |
| 2,275,430 | 3/1942 | Hart, Jr. et al. | 219/10.81 X |
| 2,385,567 | 9/1945 | Descarsin | 219/10.81 X |
| 2,423,902 | 7/1947 | Peterson | 219/10.81 |
| 2,492,000 | 12/1949 | Morris et al. | 219/10.81 X |
| 2,623,984 | 12/1952 | Ashley | 219/10.81 |
| 2,779,848 | 1/1957 | Bosomworth et al. | 219/10.81 X |
| 3,475,522 | 10/1969 | Garibian et al. | 219/10.81 X |
| 3,701,875 | 10/1972 | Witsey et al. | 219/10.81 |
| 3,786,221 | 1/1974 | Silverman | 219/10.81 X |
| 4,342,895 | 8/1982 | Krishnakumar et al. | 219/10.81 X |

FOREIGN PATENT DOCUMENTS

| | | | |
|---|---|---|---|
| 3374334 | 3/1968 | United Kingdom | 219/10.69 |
| 3830893 | 8/1974 | United Kingdom | 264/25 |

Primary Examiner—B. A. Reynolds
Assistant Examiner—Philip H. Leung
Attorney, Agent, or Firm—John W. Gregg

[57] ABSTRACT

A dielectric heating section for a blow molding machine is provided. Within the heating section a plurality of heating stations are defined by electrode pairs. At least one electrode of each pair is made recontourable to achieve the desired temperature profile within the wall section of a thermoplastic preform suspended therebetween. The preforms are rotated while supported within the alternating electric field created between the electrodes when the electrodes are energized by a radio frequency signal generator. The preforms are moved from station-to-station to achieve high rate controlled heating of each preform.

7 Claims, 6 Drawing Figures

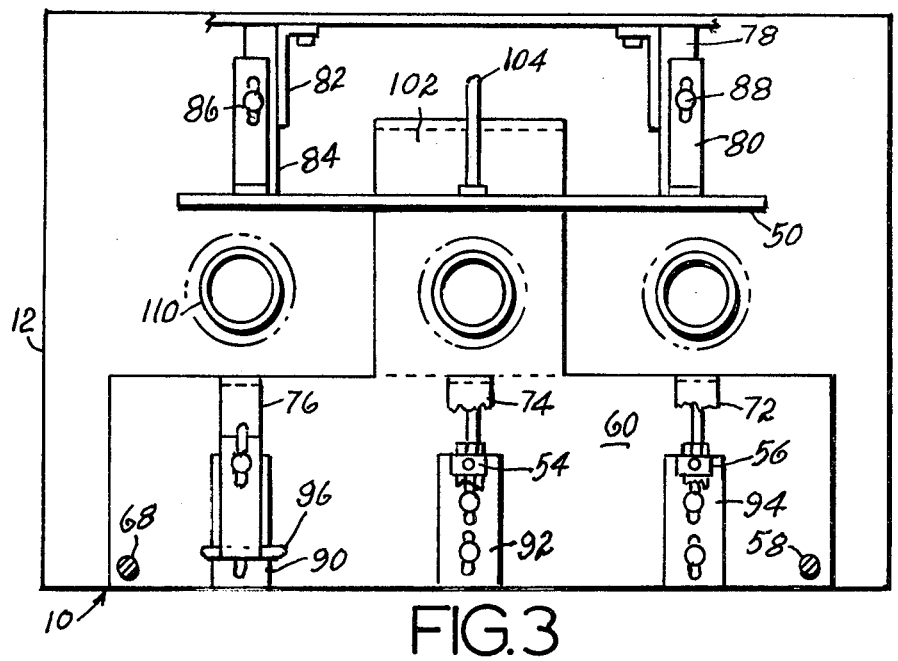
FIG.3
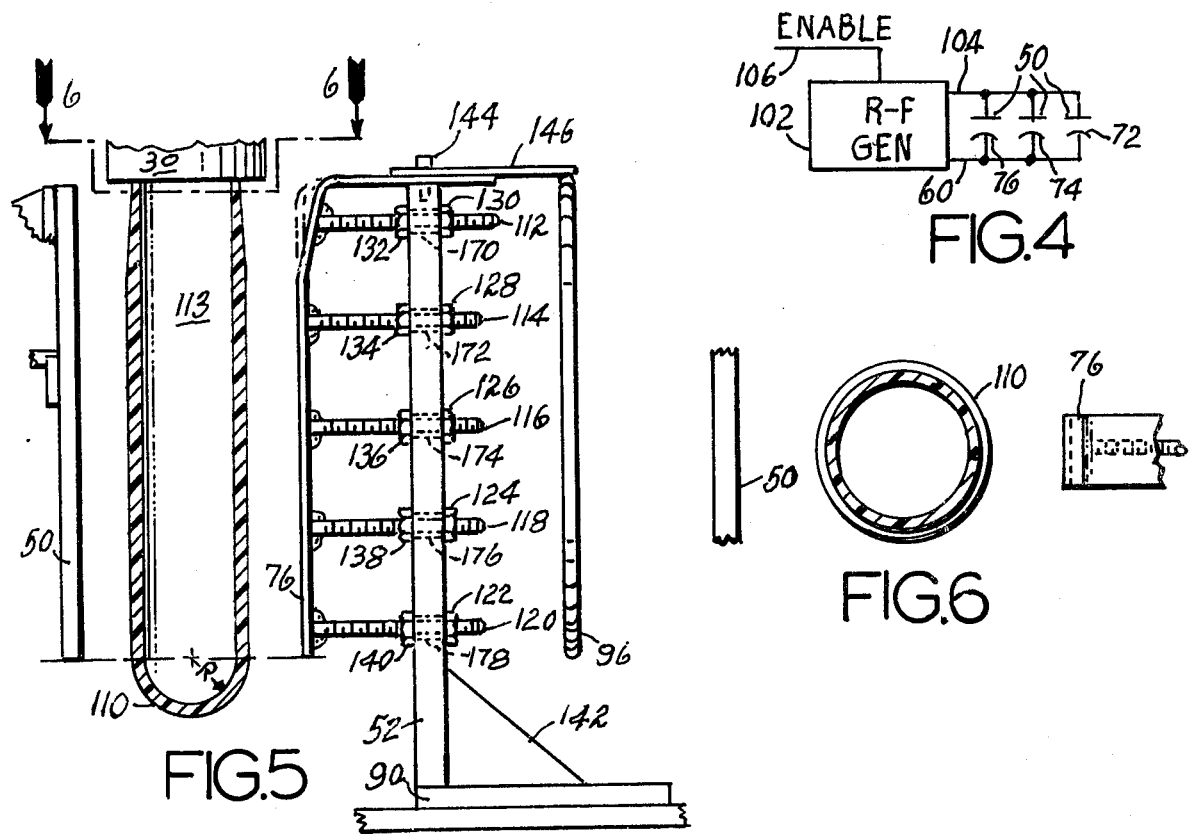
FIG.4
FIG.5
FIG.6

DIELECTRIC HEATING SECTION FOR BLOW MOLDING MACHINE

BACKGROUND OF THE INVENTION

This invention relates generally to article molding equipment of the reheat and blow type. Particularly, this invention relates to heating apparatus for the reheating of article preforms in the aforesaid molding equipment.

Reheat and blow molding equipment is used to produce finished molded articles from thermoplastic article preforms usually produced by injection molding machinery. The article preforms have a formed portion for accepting an article closure device and a formable portion to be blow molded into the shape of the finished article. The article preforms are loaded in the blow molding machine conveyor, transported through a heating section to raise the preform material temperature to its molecular orientation range, transported therefrom to a molding station at which an expansion fluid is introduced into the preform while it is retained within a mold cavity defining the shape of the finished article, and following expansion, the finished article is ejected for collection. The most time consuming operation of the overall production process is the heating of preforms to the material molecular orientation temperature. Thermoplastics are poor conductors of heat and where convection or radiant heating methods are used, the preform surface temperature elevates above the interior wall section material temperature. The rate of heating is therefore limited by the rate at which heat at the material surface can be transferred to the interior of the wall section. The upper temperature limit for acceptable finished products is the material crystallization temperature and the surface temperature must not exceed this limit. Thus, the rate of heating is further constrained by this maximum surface temperature limit.

In contrast to the aforesaid heating methods, dielectric heating is less dependent on the heat conductivity of the material. Rather, material self-heating is effected by placing the material within an alternating electric field and as the inherently polar molecules of the material move to align their poles with the instantaneous changes of polarity of the field, the kinetic energy is converted to heat within the material. While dielectric heating has been known for some time, adaptation of this technique to high rate production blow molding equipment has heretofore been unknown.

It is therefore an object of the present invention to provide an apparatus for dielectric heating article preforms for a high rate production blow molding machine.

It is a further object of the present invention to provide an apparatus for dielectric heating article preforms having a plurality of electrode pairs.

It is a still further object of the present invention to provide an apparatus for dielectric heating article preforms having contourable electrodes for controlling the temperature profile of the article preform wall section.

Further objects and advantages of the present invention shall become apparent from the following description.

SUMMARY OF THE INVENTION

In accordance with the aforesaid objects a dielectric heating section for a high production rate blow molding machine is provided. Within the heating section are a plurality of heating stations, each defined by an electrode pair. Each electrode pair is energizable by a radio frequency signal generator and establish an alternating field therebetween when energized. Preforms are conveyed into the heating section by carriers from which the preforms are rotatably supported so that the formable portions thereof are disposed between the electrodes of the pairs. At least one electrode of each pair is recontourable to alter characteristics of portions of the field therebetween to effect control of the temperature profile of the preform wall section.

In the preferred embodiment, both electrodes of each electrode pair are relocatable with respect to the heating section longitudinal centerline to effectively adjust the spacing therebetween.

BRIEF DESCRIPTION OF THE DRAWINGS

FIG. 3 is a view of the lower portion of the interior of the heating section of FIG. 1 taken in the direction of line 3—3 of FIG. 2.

FIG. 4 is a block diagram showing the electrical relationship of a radio frequency generator and the electrode pairs.

FIG. 5 is an enlarged view of an article preform shown in cross section disposed between the electrodes of an electrode pair of the heating section of FIG. 1.

FIG. 6 is a cross section through the preform and electrode pair of FIG. 5 viewed in the direction indicated by line 6—6 of FIG. 5.

DESCRIPTION OF THE PREFERRED EMBODIMENT

For purposes of illustrating the invention, a dielectric heating station for a reheat and blow type molding machine shall be described in some detail. The particular equipment to be thus described is manufactured by Cincinnati Milacron Inc., the assignee of the present invention.

The assignee's reheat and blow molding machine is arranged so that the conveyor system is defined by a plurality of modular carriers traversing through continuous paths defining a lane or a plurality of lanes within the machine. The operating stations, i.e. the load station, the reheating section, the blow molding station and the eject station are disposed along these continuous paths to permit the ongoing incremental advance of carriers from one station to the next. This simplifies the conveyor drive mechanism required and simplifies the overall system control scheme in that an incremental advance of the conveyor drive system is initiated upon completion of the operating station functions. By using modular carriers, the handling of preforms and articles is minimized and relatively high rates of production are achieved.

Figure 1:
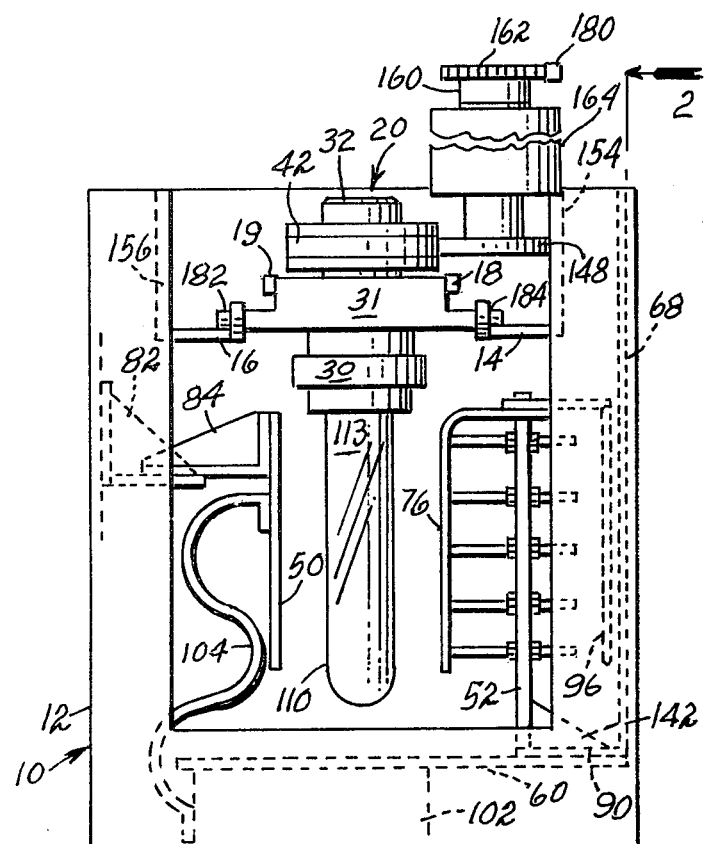
FIG. 1 is an end view of a dielectric heating section of a high rate production blow molding machine.

Referring to FIG. 1, the article carrier 20 is seen supported within the oven section 10 through the end plate opening in enclosure 12. Suspended below article gripping chuck 30, is the formable portion 110 of preform 113. In this view, the preform 113 is seen positioned between electrode plate 50 and recontourable electrode 76 supported upon post 52. As previously stated, the machine conveyor incrementally advances carriers through the machine operating stations. In this view, carrier 20 is seen supported by its rollers 182 and 184 upon rails 16 and 14. These rails are suspended from the upper surface of enclosure 12 by support brackets 154 and 156. The conveyor advance chains 18 and 19 are seen engaged with carrier body 31. In order to advance carriers through the machine, the conveyor chains are incrementally advanced by a conveyor drive train (not shown). To achieve even heating of the formable portion 110 between the electrodes 50 and 76, it is necessary to impart rotation to preform 113. This is accomplished by means of the rotatably supported spindle 32 projecting from carrier body 31 and the rotation imparting friction wheel 42 seen affixed to the upper end of spindle 32. The friction wheel 42 is engaged with rotation drive disk 148. Drive disk 148 is attached to lower end of spindle 160 in spindle bearing block 164 supported by the top cover of enclosure 12. Spindle 160 is in turn driven by drive sprocket 162 attached to the upper end of spindle 160. Sprocket 162 is rotated by engagement with rotation drive chain 180. Unlike the conveyor advance chains 18 and 19, the rotation chain 180 does not extend beyond the outer limits of the heating section 10. The rotation drive chain 180 is continuously advanced by a chain drive train (not shown).

Continuing with reference to FIG. 1, seen in this view in phantom are the r-f generator 102 and the T-plate 60 electrically connected to generator 102 and to the recontourable electrode posts as for example 52. T-plate support 68 is seen in phantom as is the support bracket 142 and base 90 for electrode post 52. In addition, the mounting brackets 82 and 84 of electrode plate 50 are seen partially in phantom in this view.

Figure 2:
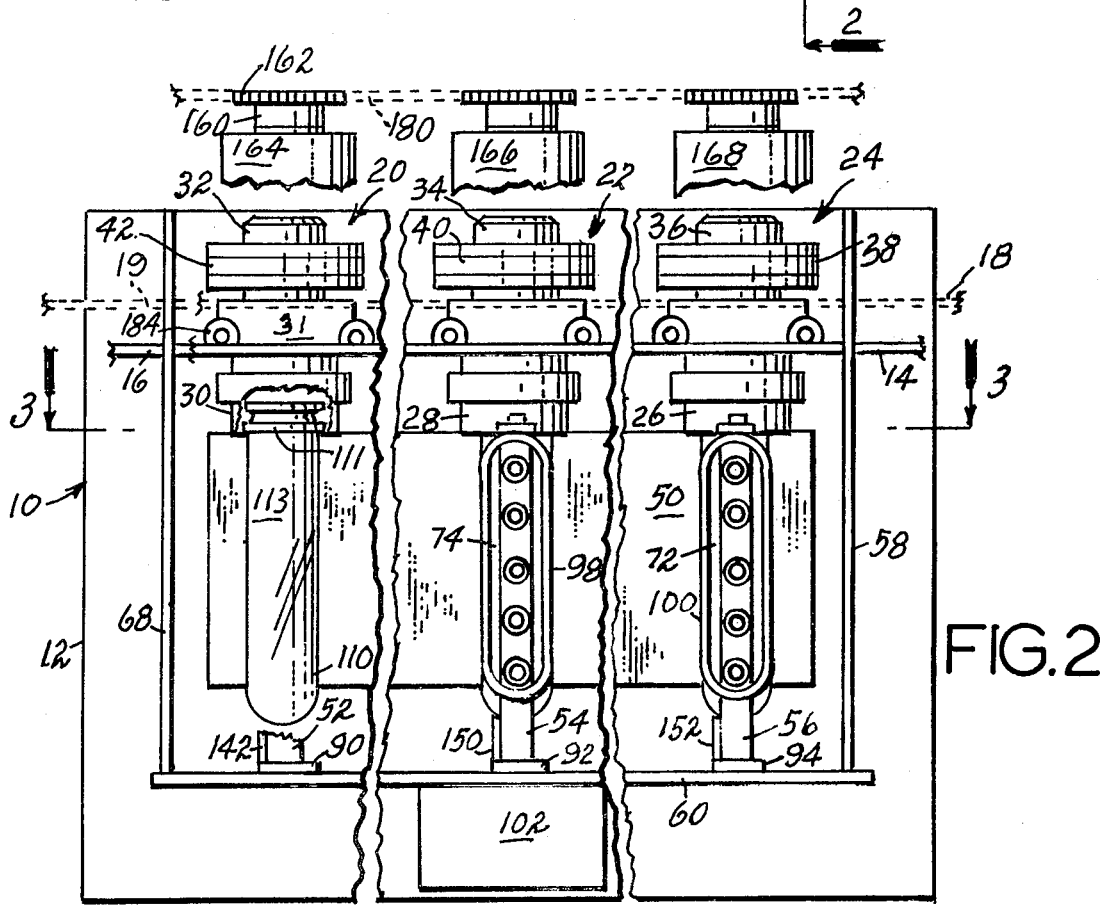
FIG. 2 is a front view of the interior of the heating section of FIG. 1 in the direction of line 2—2 of FIG. 1.

Referring now to FIG. 2, the interior portion viewed in the direction of line 2—2 of FIG. 1 reveals three dielectric heating stations defined by the electrode posts 52 through 56 mounted upon plate 60. In this view, carriers 20 through 24 are seen positioned at the dielectric heating stations and supported upon rails 14 and 16. Electrode post 52 is seen cut away just above T-plate 60 to reveal details of preform 113 including the formable portion 110 extending below chuck 30 and the formed portion 111 seen in the confines of the breakaway of chuck 30. Friction wheels 38 through 42 are seen respectively attached to spindles 36 through 32 of carriers 20 through 24. Friction wheels 38 through 42 are shown behind the engaging rotation drive disks. Rotation drive assemblies 166 and 168 are shown cut away above carriers 22 and 24 to reveal carrier spindles 34 and 36 and friction drive wheel 40 and 38. Sprockets of spindles of rotation drive assemblies 166 and 168 are shown engaged by rotation drive chain 180 as well as sprocket 162 of spindle 160. The electrode posts 52 through 56 are shown mounted upon base plates 90 through 94 with support braces 142, 150 and 152. Corona rings 98 and 100 are seen at the back of electrode posts 54 and 56. These corona rings aid in suppressing arcing as might otherwise occur when the electrode posts are energized by r-f generator 102. Electrode plate 50 is seen to extend within the length of the enclosure 12 slightly beyond the span defined by the centers of extreme electrode posts 52 and 56. Support posts 58 and 68 are seen depending from the top of enclosure 12 to T-plate 60.

With each incremental advance of conveyor chains 18 and 19, a carrier is brought to position between the electrodes of a pair defined by one of the recontourable electrodes 72 through 76 and the electrode plate 50. Upon completion of the conveyor advance, the machine cycle control (not shown) permits energization of the electrode pairs by r-f generator 102. Upon completion of the functions at the other operating stations of the machine, and, provided the heating cycle is complete, the machine cycle control effects another advance of conveyor chains 18 and 19 and the cycle repeats. In this fashion, preforms enter the heating station 10 at the left end of FIG. 2 and advance from station-to-station until exiting at the right end of this Fig. It will now be appreciated that within the heating section 10 the row of carriers 20 through 24 supported upon the conveyor rails 14 and 16 constitute a lane through which article preforms pass.

Referring now to FIG. 3, the lower portion of the interior of heating station 10 is seen as viewed in the direction of the line 3—3 of FIG. 2. Three electrode pairs are seen as defined by the electrode plate 50 and the recontourable electrodes 72 through 76. The preform lane is defined by the gap between electrodes of these electrode pairs. In this view, the outline of T-plate 60 is shown. The cutaway of plate 60 to form the T configuration serves to reduce losses as would otherwise occur between plate 60 and electrode 50 in the vicinity of extreme end posts 56 and 52. Support brackets 78 through 84 for electrode plate 50 are shown to reveal the construction permitting adjustment of the position of plate 50 with respect to the longitudinal centerline of heating station 10. Brackets 80 and 84 are supported upon brackets 78 and 82 and secured thereby by screws 88 and 86 passing through position adjusting slots cut through all support brackets 78 through 84. In a similar manner, base plates 90 through 94 for electrode posts 52 through 56 are made positionable upon T-plate 60 by means of the attaching nuts and slots cut in base plates 90 through 94. In this Fig., corona rings 98 and 100 have been omitted to reveal the position adjusting slots of base plates 92 and 94. However, corona ring 96 is shown with its supporting bracket affixed to the upper end of electrode post 52. The conductor 104 seen in profile and partially in phantom in FIG. 1 is shown running between r-f generator 102 and electrode plate 50.

Referring now to FIG. 4, a schematic block diagram of the r-f generator and the electrodes constituting the heating stations of heating section 10 is shown. The electrode plate 50 appears as a capacitor plate in each of the three load capacitors for r-f generator 102. These plates are connected together through conductor 104 to the r-f generator. The recontourable electrodes 72 through 76 constitute the mating plates and are connected together at one end thereof and connected to the r-f generator by a conductor 60 which corresponds to T-plate 60. The three electrode pairs 50 and 72 through 76 are electrically equivalent to the three dielectric heating stations within heating section 10. Upon completion of the conveyor index, the machine cycle control (not shown) produces an enable signal on line 106 to r-f generator 102 which permits the r-f generator output to be applied to the electrode pairs. In this fashion, the alternating electric potential at the output of the r-f generator creates an alternating electric field between the electrodes of the three electrode pairs. The relative strength of the electric field at any point between the electrodes of the electrode pairs is partially dependent upon the loss of energy by conduction through the dielectric disposed between the electrodes of an electrode pair. Thus, by adjusting the spacing between the capacitor plates i.e. between the electrodes of an electrode pair, there may be effected a reduction of the effective impedance created by the plates of the capacitor and attendant increase in current across the dielectric. It will be appreciated by those skilled in the art that the gradient of field strength across the dielectric between the electrodes is a function of the relative potential between the electrodes and the distance from electrode-to-electrode. Applicants make use of this inherent characteristic of the electric field in achieving the desired temperature profile within the preform wall section.

Referring to FIG. 5, the formable portion 110 of preform 113 is shown in cross-section to reveal the changing wall section thickness with respect to the length of the preform. The preform is seen suspended from chuck 30 between electrode 50 and recontourable electrode 76 supported upon electrode post 52. Electrode 76 is in the form of a continuous strip and is rigidly affixed to threaded studs or rods 112 through 120. These studs are in turn placed transversely through clearance holes 170 through 178 in post 52. Nuts 122 through 140 threaded onto studs 112 through 120 are used to adjust the transverse position of studs 112 through 120 with respect to post 52 and lock the studs in position thereon. Where, as shown in this Fig., the formable portion preform wall section is thinner near the formed portion the recontourable electrode 76 may be shaped so as to increase the distance between electrode 76 and that portion of the preform wall section. Further, regarding closure in the lower end of the preform, the recontourable electrode and the electrode plate are made so that the lower extremity of the electrode pair terminates above that portion of the preform. In particular, the lower extent of the electrode pair is made approximately coincident with the beginning of the radius of the closed end of the preform. As this closed lower end constitutes a path of least resistance for the electrical field between the electrodes, the field flux lines will naturally tend to follow this contour. Since this would result in accelerated self-heating for this portion of the preform, applicants have chosen to place this portion of the preform at a periphery of the electric field created between the electrodes. This tends to permit the self-heating within the wall section to conduct heat through the closed lower end of the preform while minimizing the self-heating of the closed end. In a similar fashion, the recontourable electrode 76 is made slightly narrower than the preform inside diameter as illustrated by the cross section of FIG. 6 so that the sides of the preform lying more or less transverse in the lane through the heating station 10 are also in the periphery of the electric field defined by the electrode pair. By continuous rotation of the preform while held in the field between the electrodes, the wall section is uniformly heated in a controlled manner.

Continuing with reference to FIG. 5, it is seen that the recontourable electrode 76 is folded back and held in place at the upper end of post 52 by screw 144. Also, under this screw, is the corona ring mounting strap 146 which is tied to the upper end of corona ring 96. As previously stated the purpose of corona ring 96 is to reduce arcing between the post 52 and the contour adjusting studs 112 through 120. It will be appreciated by those skilled in the art that the combination of adjusting studs 112 through 120 and locking nuts 122 through 140 provide a broad range of contours of electrode 76 thereby permitting a combination of a broad variety of designs of formable portions of preform wall sections.

Since the strength of the electric field is instantaneously dependent upon the distance between the electrodes and the dielectric disposed therebetween, the effective field strength at any point along the longitudinal length of the preform wall section may be varied by altering the contour of the recontourable electrode. Where, as shown in FIG. 5, the preform wall section is thinner near the formed portion, less energy is required to elevate the temperature of the material in this segment of the wall section to the molecular orientation temperature. Therefore, to achieve a uniform temperature throughout the formable portion, it is necessary to reduce the self-heating effects at the thinner wall section as compared to the thickest segment. This is accomplished by increasing the gap between electrodes in the region of the thinner wall section. The contour of the recontourable electrode is thus dictated by the temperature profile desired over the longitudinal length of the preform wall section and the geometry of the wall section. Where extreme variations of the field strength are required, it may be necessary to make both electrodes of the pair recontourable. Applicants have had success over a broad range of preform shapes and sizes using a single recontourable electrode in each electrode pair. This same method of adjustment serves to produce variations in temperature along the longitudinal length of the preform walls as may be desirable in some circumstances.

While the invention has been described in considerable detail with regard to the preferred embodiment, it is not intended by applicants to so restrict the scope of the present invention to this detail. Specifically, any number of heating stations within the dielectric heating station 10 may be accomodated by elementary adaptation of the combinations shown and described herein. Further, while dielectric heating is effective for materials exhibiting polar molecular properties, it is not intended by applicants to limit application of their invention to any particular thermoplastics as polar properties may be achieved by additives to non-polar materials. It is therefore, the intention of applicants to cover all modifications, alterations, and equivalents falling within the spirit and scope of the appended claims.

What is claimed is:

1. Apparatus for dielectric heating tubular thermoplastic article preforms, each article preform having a formed portion and a formable portion, the formable portion to be heated to the molecular orientation temperature in preparation for biaxial expansion into a finished article, the apparatus comprising:
   (a) a radio frequency signal generator for producing an alternating electric potential having a frequency in the radio frequency range;
   (b) an electrode pair energizable by the signal generator, the electrodes of the pair arranged to establish an alternating electric field therebetween when energized by the electric potential, the pair having at least one recontourable electrode comprising;
      (1) a support post,
      (2) a continuous strip attached to the support post with a portion of its length substantially parallel to and facing the other electrode of the pair, the post and strip being less wide than the inside diameter of the preform, and
      (3) means for adjustably supporting by the post said portion of the length of the strip, the supporting means providing adjustment of the distance between the strip and the post to define a contour of said portion of the strip; and (c) means for rotatably supporting a single preform by its formed portion with the formable portion between the electrodes of the electrode pair, the preforms being located with the inside diameter thereof extending equally beyond the width of the recontourable electrode.

2. The apparatus of claim 1 further comprising means for relocating the electrodes of the electrode pair to alter the relative distance therebetween.

3. The apparatus of claim 1 including a plurality of electrode pairs wherein the electrodes of the electrode pairs are arranged so as to define a single substantially straight lane therebetween.

4. The apparatus of claim 3 wherein the electrode facing the recontourable electrode comprises a substantially flat plate relocatably supported with respect to the lane centerline.

5. The apparatus of claim 4 wherein the radio frequency generator is mounted below the lane and placed approximately equidistant from the extreme end electrode pairs and the apparatus further comprises an electrode mounting plate upon which the support posts are mounted, the mounting plate covering the radio frequency generator and being cut away in areas below the lane and beyond the outline of the generator.

6. The apparatus of claim 2 wherein the strip supporting means further comprises:

(a) a plurality of parallel rods slidably supported within the support post, each rod having one end fixedly attached to said portion of the length of the strip; and (b) locking means for independently locking the length of projection of a rod between the post and the strip, thereby defining a contour of said portion of the length of the strip.

7. The apparatus of claim 6 wherein the lower extremities of the electrode strip and the electrode faced thereby terminate above the closed end of the preform therebetween.

* * * * *